United States Patent [19]

Rudd et al.

[11] 4,234,776
[45] Nov. 18, 1980

[54] METHOD OF PRODUCING AREAS OF ALLOY METAL ON A METAL PART USING ELECTRIC CURRENTS

[75] Inventors: Wallace C. Rudd, New Canaan; Humfrey N. Udall, Darien, both of Conn.

[73] Assignee: Thermatool Corp., Stamford, Conn.

[21] Appl. No.: 923,778

[22] Filed: Jul. 12, 1978

[51] Int. Cl.³ .................... B23K 9/04; H05B 6/00; B23K 11/00
[52] U.S. Cl. ......................... 219/76.17; 219/8.5; 219/9.5; 219/10.43; 219/76.1
[58] Field of Search ............. 219/7.5, 8.5, 9.5, 10.41, 219/10.43, 76.1, 76.11, 76.17, 77; 148/13, 13.1

[56] References Cited

U.S. PATENT DOCUMENTS

| | | | |
|---|---|---|---|
| 2,164,310 | 7/1939 | Denneen et al. | 219/10.41 X |
| 3,267,252 | 8/1966 | Morris | 219/7.5 X |
| 3,497,662 | 2/1970 | Rudd et al. | 219/104 X |
| 3,504,148 | 3/1970 | Maximovich et al. | 219/7.5 X |
| 3,591,757 | 7/1971 | Rudd | 219/67 |
| 4,006,337 | 2/1977 | Maxim | 219/8.5 |
| 4,039,700 | 8/1977 | Sohmer et al. | 219/9.5 X |
| 4,117,302 | 9/1978 | Earle et al. | 219/76.1 X |

FOREIGN PATENT DOCUMENTS

| | | |
|---|---|---|
| 48-34487 | 10/1973 | Japan .................. 219/137 R |
| 467308 | 6/1937 | United Kingdom . |
| 644821 | 10/1950 | United Kingdom . |
| 743582 | 1/1956 | United Kingdom . |
| 918482 | 2/1963 | United Kingdom . |

OTHER PUBLICATIONS

*Heat Treating*, Feb. 1977, pp. 16-21, "Laser Heat Treating", by Lawrence W. Carley.
*Automotive Industries*, Aug. 1, 1976, pp. 31-33, "The Laser Takes on the Hard Ones", by Carl A. Gottesman.

*Primary Examiner*—B. A. Reynolds
*Assistant Examiner*—Keith E. George
*Attorney, Agent, or Firm*—Brooks, Haidt, Haffner & Delahunty

[57] ABSTRACT

A method and apparatus for modifying the surface properties of a metal part in which electric current having a frequency of at least 3000 Hz is supplied to a narrow area on the part by means of contacts, one at each end of the area, and a proximity conductor or is induced therein by an induction coil until the metal in the area reaches a temperature at least equal to its melting temperature. A material which will alloy with the metal of the part is added to the molten metal so that when the molten metal is cooled an area of an alloy of the metal and the added material is produced. The added material may be in the form of a gas, powder, salt, wire, rod, bar, foil, etc. and may be applied to the area before, during, or after the melting of the metal of the area. The spacing between the proximity conductor or the induction coil and the work is no greater than three times the width of the proximity conductor or the coil conductor.

27 Claims, 35 Drawing Figures

METHOD OF PRODUCING AREAS OF ALLOY METAL ON A METAL PART USING ELECTRIC CURRENTS

This application relates to a process and apparatus for modifying the surface properties of a metal part employing electrical heating of the metal at a restricted area on its surface to raise its temperature to its melting temperature while, at the same time, adding another material to the molten metal which will alloy with the metal of the part causing them to form an alloy of the metal and the added material.

It frequently is desirable to make the body of a metal part of one metal selected for certain properties, e.g. strength, cost, weight, elasticity, etc., and to provide an area on the body with different properties. For example, it may be desirable to provide an area of metal having better wearing, corrosion resistance, hardness, cutting, and/or lower friction properties than those of the body metal. Also, for example, it may be desirable to provide an area having an appearance or color different from the body metal or to provide electrical contacts on the body.

It is well known in the art that certain desirable metal properties can be obtained by mixing other materials, such as carbon, nitrogen, other metals, etc., with a metal in its molten state, the cooled metal being an alloy having properties different from the metal which was melted. It is also known to form thin layers of alloys on a metal part by applying a layer or wire of the alloying metal, or the alloying metal in powder form, to the surface of a metal part and then heat the alloying metal and the underlying metal with a laser beam to heat at least the underlying metal to its melting point and thereby form an area on the surface of the metal part which is composed of an alloy of the metal of the part and the alloying metal. See, for example, the articles in "Automotive Industries", Aug. 1, 1976, beginning at p. 31, and in "Heat Treating", February 1977 beginning at p. 16.

The operating efficiency of laser beam apparatus used for such purposes is relatively low, e.g., of the order of 7–10%, and the cost thereof is relatively high. In addition, high average power laser beam apparatus is not available even though high peak power pulses, with low average power, are produced. Furthermore, to produce the power, e.g., 100,000 w/cm$^2$, and heat concentration required, the beam is very small in cross section which means relatively slow processing rates for larger areas. Also, the beam strikes the surface from which the heat must spread by conduction, and the surface must be clean and be a good laser energy absorbing surface. Because the beam strikes the surface, only the surface may melt before adjacent areas are heated to the desired temperature.

It is known in the art that high concentrations of electric current in a metal part can be produced by contacting the metal part with a pair of contacts, one at one end of the desired path and one at the other end of such path, and connecting the contacts to a high frequency current source, at least one of the contacts being connected to the source, through a conductor, known as a proximity conductor, which extends from adjacent one contact to the other contact and which is closely adjacent to and follows the desired current path. See, for example, U.S. Pat. Nos. 2,857,503, 3,591,757 and 3,860,778.

From the latter patent, it is known to melt portions of the metal of a pair of contacting metal parts for forming a weld therebetween and to add metal in the form of wire, powder or chips to the molten metal. In such patent, it is contemplated that the added metal be the same as, or similar to, the metal of the parts being welded together and that the added metal be rendered molten so as to fill any gaps, depressions or crevices which may result from the melting of the parts.

It is also known from U.S. Pat. No. 3,497,662 to add filler metal in the form of a foil, wire or rod at the joint between two metal parts being welded together using such apparatus and methods. However, the metal of the filler metal is the same as, or similar to, the metal of the metal parts and metal of such parts is not melted. As far as we are aware, such apparatus has not been used, or suggested for use, for the formation of areas of alloy metal on the surface of a metal part.

One object of the invention is to provide a method and apparatus for providing a layer of metal at the surface of a metal part which is structurally continuous and which is at least partly an alloy of the metal of the part and another material and preferably, having improved mechanical properties as compared to the metal of said part.

In accordance with one embodiment of the invention, high power densities, e.g. 20 kilowatts per square centimeter and higher, are produced along a narrow path in a metal part by supplying electric current to such path by means of contacts, one at each end of the path, by suitably selecting the current frequency and magnitude so that a large current effectively penetrates the metal only a small amount and by feeding the current to at least one of the contacts through a proximity conductor, properly located and of the proper size, until the metal along such parts reaches a temperature at least equal to its melting temperature. An alloying material, such as another metal or metal similar to the part but alloyed to have a different composition from the metal of the part, is deposited in the surface of the part either before or during the supply of heating current, or after the metal along the path of heating has melted, so that a structurally continuous area comprising an alloy of the metal said part and the alloying material is produced on the surface of the part. If the alloying material is in the form of particles, the temperature to which the metal along the current path is heated is such that such particles melt and alloy with such metal. If the alloying material is in structurally continuous form, such as a thin sheet, a rod or a wire, the temperature is such that at least the surface portion thereof melts and forms an alloy with the metal of the part so that the alloying material is at least bonded to the metal part by an alloy of the alloying material and the metal of the part. The alloying material in such continuous form may be completely melted, and when it is, it may completely mix with the metal of the part so that substantially the entire area is an alloy of the added material and the metal of the part, or there is structurally continuous added material bonded to the metal of the part by structurally continuous metal which is an alloy of the added material and the metal of the part, the actual structure depending on the heating and mixing of the metal of the part and the added material and the melting temperature of the added material.

In an alternative embodiment of the invention useful when the area of metal part to be melted is ring shaped, the heating of the metal to its melting temperature is caused by inducing an electric current therein by means of an induction coil connected to a source of high frequency current, the method otherwise being the same as the method of the invention previously described.

Other objects and advantages of the present invention will be apparent from the following detailed description of the presently preferred embodiments thereof, which description should be considered in conjunction with the accompanying drawings in which:

As described in co-pending applications Ser. No. 923,776, filed July 12, 1978, and entitled "Surface Hardening of Metals Using Electric Currents" and Ser. No. 923,777, filed July 12, 1978, and entitled "Embedment of Hard Particles in a Metal Surface" the heat developed in metal by electric current is proportional to the square of the current times the effective resistance of the path through which the current flows. The effective path of the current depends upon the skin effect, i.e., the increased current density at the surface of a part, the proximity effect, i.e., the tendency of the current in the part to flow as near as possible to a conductor, e.g. a proximity conductor, carrying oppositely flowing current, and the reference depth, i.e., the equivalent depth assuming (even though it is not the case) a uniform current distribution to such depth, which is defined by the formula:

$$d \text{ in inches} = 3160 \sqrt{\frac{p}{uf}}$$

where p is the resistivity of the metal in ohm inches, u is the relative magnetic permeability and f is the frequency in cycles per second. It will be noted that reference depth decreases with increases in frequency, which, in turn, means that the effective resistance increases with frequency. Since reference depth is also dependent upon permeability, and since magnetic materials such as steel lose their magnetic properties above a certain temperature (Curie point), it will be apparent that the reference depth for such materials progressively increases as they are heated.

The reference depth of current in a metal is determined from the formula set forth hereinbefore, and it is sometimes referred to as the depth in which 86% of the heat is developed and within which about 86% of the current flows. Typical reference depths, in inches, in various metals at 70° F., are as follows:

| Material | Frequency - Kilohertz | | | | |
|---|---|---|---|---|---|
| | 0.06 | 3 | 10 | 100 | 400 |
| Steel* | 0.041 | 0.0066 | 0.0002 | 0.00059 | 0.0003 |
| Aluminum | 0.430 | 0.110 | 0.033 | 0.010 | 0.005 |
| Brass | 0.640 | 0.150 | 0.050 | 0.016 | 0.008 |
| Copper | 0.336 | 0.085 | 0.026 | 0.008 | 0.005 |

*Below Curie Point; for non-magnetic steel or magnetic steel above Curie Point multiply by 100 for approximate value.

Proximity effect is also dependent both on current frequency and the spacing between the paths carrying oppositely flowing currents. At current frequencies below about 3000 hertz, proximity effect is relatively small, but proximity effect becomes significant at 3000 hertz or higher and becomes increasingly important at 50 kilohertz and higher. At spacings between the centers of round conductors of the order of five or more times the conductor diameters, the effect is relatively small, but with spacings less than twice the diameters, the effect is significant. Similar effects are present with conductors of other shapes. Thus, in order to be effective for the purposes of the invention, the heating current frequency must be at least 3000 hertz and preferably, is at least 50 kilohertz, and the spacing between the proximity conductor and the faces of the metal portion to be heated should be less than five times the width of the proximity conductor. Preferably, the spacing is less than three times the the width of proximity conductor with, best results being provided when the spacing is equal to, or less than, the width of the proximity conductor.

The width of the current path in the part is also influenced by the use of magnetic pieces at the sides of the current path and by the shape and spacing of the proximity conductor carrying oppositely flowing current, the latter being illustrated in FIGS. 7-10 and described in the copending application, of Rudd, Serial No. 901,360, filed May 1, 1978 and entitled "High Frequency Induction Welding with Return Current Paths on Surfaces to be Heated". Thus, by increasing the spacing between the proximity conductor and the metal to be heated, the width of the current path is increased, and by increasing the width of the proximity conductor in a direction parallel to the width of the current path, the width of the current path is increased.

At high frequencies the path of the major portion of the current is determined mainly by the reactance of the path rather than by the resistance thereof, and therefore, the major portion of the current may not follow the shortest path between two points of different potential. Since the proximity conductor decreases the reactance of the current path thereadjacent, the principal current path may be made to be a path adjacent the proximity conductor even if such path is not the physically shortest path.

Of course, heat is transferred to the portions of the part outside the path of current by conduction flow at a rate dependent upon the thermal conductivity of the metal, but by rapidly heating the metal in the major current path to a high temperature and then discontinuing the current flow, the temperature of such portions may be kept low as compared to that of the current carrying metal.

For all these reasons, the path of current flow and its effective dimensions, the heating and temperature obtained and the localization of the heating are dependent upon many factors including the presence or absence of a proximity conductor, the shape and location of the proximity conductor with respect to the part to be heated, the time duration of current flow, the electrical and thermal characteristics of the metal, the configuration of the part being heated, the presence or absence of magnetic material adjacent the current path, etc. In accordance with the invention, use is made of such phenomena to provide restricted and rapid heating of the metal to be treated and to heat a portion of such parts to at least its melting temperature without raising the temperature of the metal spaced a short distance from such portion, either to the side or below thereof, to melting temperature.

Similar considerations apply when an electric current is caused to flow in a metal part by means of an induction coil, that is, the reference depth and effective resistance of the current in the metal part are the same, the coil acts like a proximity conductor since the current flowing therein flows oppositely to the current induced in the part, and heat is generated and transferred in the same manner as when contacts and a proximity conductor are used to supply the heating current. However, when the current is induced in the metal part the current must flow in a continuous path in the metal part whereas with contacts, the current merely flows from contact to contact. Nevertheless, if the metal area to be heated is continuous or re-entrant, an induction coil conforming to the shape of the area and connected to a high frequency current source may be used to induce the heating current in the path even though the use of such coil is not as satisfactory, in certain aspects, as the use of contacts and a proximity conductor or conductors.

The methods of the invention are applicable to producing areas of alloyed metal of many different shapes on many different metal parts. Since the heated area conforms closely to the shape of the proximity conductor, the area can be rectilinear, curving, circular, spiral, etc. or can merely be a small spot. The area can also be provided, for example, on the ends or peripheries of rods or shafts, the surfaces of slides, machine tool ways, pistons, valves, valve seats, cutting tools, drills, bearing races, screw threads, electrical switch armatures, rolls, earth moving equipment, etc. and on the internal walls of cylinders, bearings, valve guides, etc. However, only the principles of the invention with application thereof to parts of simple configuration will be described herein in detail, the application of the principles to other parts being readily apparent to those skilled in the art from such description.

Figures 1, 2, 3, 4, 5:
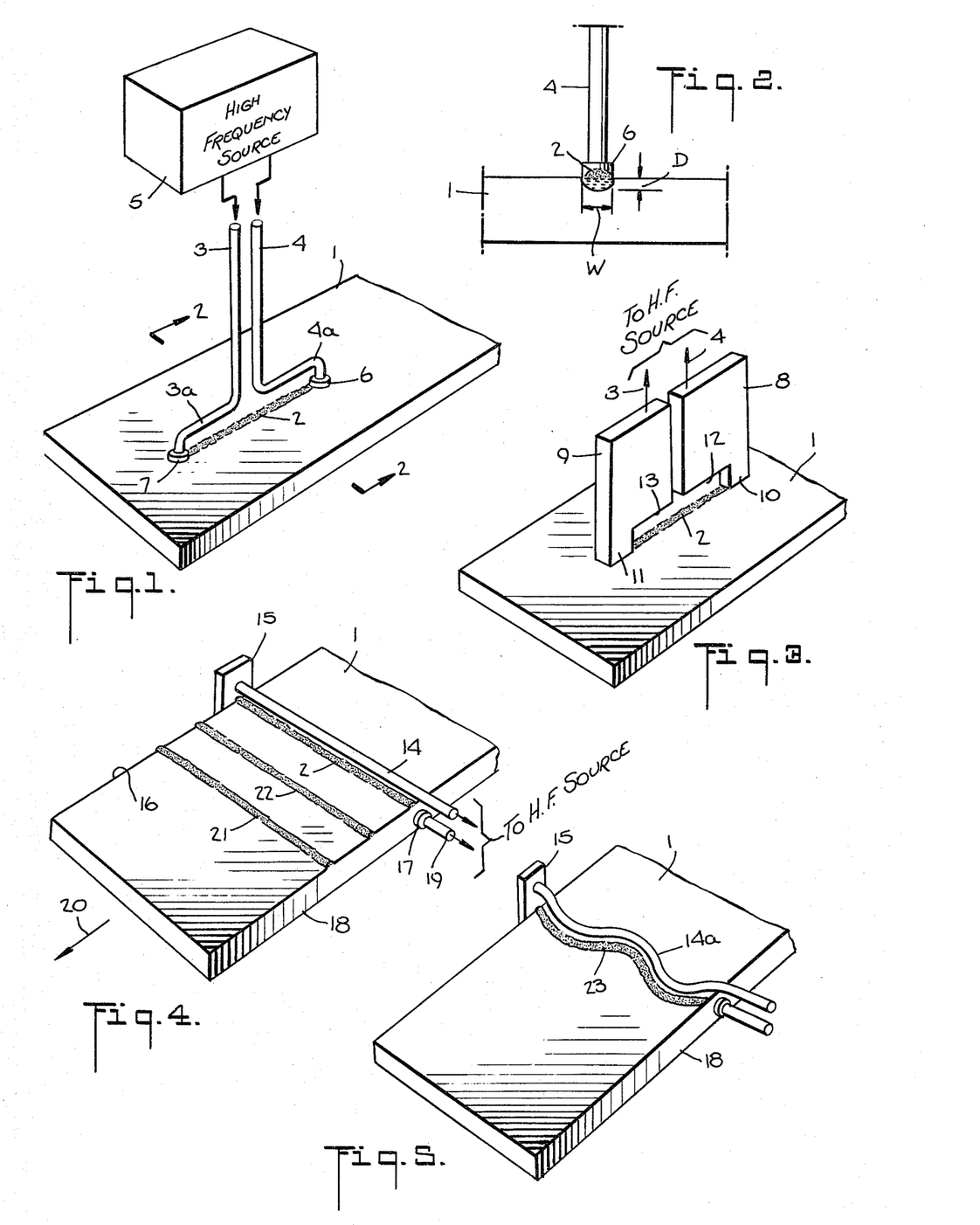
FIG. 1 is a schematic, perspective view of apparatus for heating a metal part and at least part of an alloying material to their melting points along a line.
FIG. 2 is a cross-sectional view of the embodiment shown in FIG. 1 and is taken along the line 2—2 indicated in FIG. 1.
FIG. 3 is similar to FIG. 1, but illustrates a modified form of apparatus.
FIG. 4 is a schematic, perspective view illustrating a further modified form of apparatus and the heating to their melting points of a plurality of lines of metal and an alloying material on the surface of a metal part.
FIG. 5 is similar to FIG. 4 but illustrates a sinuous proximity conductor.

The basic principles of the invention are illustrated in FIGS. 1 and 2. Such figures show a metal part 1 which is to be melted along the path underlying the alloying material 2 for the purpose of producing fused or alloyed metal at the surface of the part 1. High frequency current is caused to flow along such path by means of a pair of conductors 3 and 4 connected at one end to a source 5 of high frequency current and connected at their opposite ends respectively to the opposite ends of the path through a pair of contacts 6 and 7.

The leads 3 and 4 have a pair of horizontal portions 3a and 4a which extend substantially parallel, and in closely spaced relation, to the upper surface of the metal part 1. It will be noted that the currents in the portions 3a and 4a are flowing oppositely to the current in the adjacent path in the metal part 1 at any given instant of time, and therefore, the portions 3a and 4a act as proximity conductor means for concentrating the current at the path under the alloying material 2. Such path is the physically shortest path between the contacts 6 and 7, and while most of the current would flow along such path in the absence of the portions 3a and 4a, the width of the current path would be greater in the direction parallel to the upper surface of the part 1 and perpendicular to a line between the contacts 6 and 7. With the proximity means 3a and 4a, the width of the current path is approximately equal to the diameter, and hence the width of the portions 3a and 4a.

In FIG. 2, the cross-section of the current path underlying the material 2 is indicated by the shaded area, and the depth D is the reference depth or the depth within which about 86% of the current flows and about 86% of the heat is developed. Thus, by suitably selecting the frequency of the current in relation to the metal of the part 1, the depth of the rapidly heated metal can be controlled.

As mentioned hereinbefore, the width W of the cross-section of the path underlying the particles 2 can be controlled by the spacing of the portions 3a and 4a with respect to the upper surface of the part 1, and width and shape of the portions 3a and 4a. Thus, by keeping the spacing between the portions 3a and 4a and the upper surface of the part 1 less than five times, and preferably, two times or less, than the cross-sectional width of the portions 3a and 4a, there is significant proximity effect, and the less the spacing, the smaller the width W will be. Similarly, by keeping the cross-sectional width of the portions 3a and 4a small, consistent with the current carrying and heat dissipation requirements, the width W is kept small, the narrower the width of the portions 3a and 4a, the smaller the width W. The portions 3a and 4a may, for example, be copper tubing of 3/16 or ¼ inch outside diameter which is internally water cooled, the water being under high pressure.

Accordingly, by selecting the frequency of the heating current and the width of the portions 3a and 4a (proximity conductors) and their spacing with respect to the upper surface of the part 1, rapid heating of a very narrow and shallow volume of metal along the path underlying the alloying material 2 can be accomplished. It is practical to obtain a heating power density in the current path of 20 kilowatts per square centimeter and higher and to heat metal to melting temperature along paths of various lengths in less than three seconds, without melting metal outside such paths, examples of the path width and depth being, respectively, 0.080 inches or less and 0.020 inches or less. Of course, if desired, the paths can be made wider and deeper using the principles discussed hereinbefore, i.e. selection of frequency, and proximity conductor size and spacing, and selection of the time of current flow and the current magnitude, but care must be taken to concentrate the current and its duration so that the metal does not melt through and so that a large area is not heated by conduction of the heat through the metal adjoining the current path.

If the alloying material 2 is in the form of small particles, the conductivity thereof will be relatively low, and most of the current will flow in the metal of the part 1 underlying the material 2.

After the metal of the part 1 underlying the particles of material 2 has become molten, the particles will sink into the molten metal and fuse and/or form an alloy with the molten metal provided that the density thereof is high enough and the temperature of the molten metal is sufficiently high. If desired, the particles of the material 2 may be pressed into the molten metal as described hereinafter.

If the alloying material 2 is in the form of a wire, foil, rod, strip, tube etc. it will have a relatively high conductivity, and since it is in conductive contact with the surface of the part 1, substantial current will also flow in the material 2 so that it may melt completely or at its surface either before or during the time that the underlying metal of the part 1 is being heated. In either case, when the underlying metal becomes molten, at least a portion of the alloying material 2 will fuse with the molten metal of the part 1. Thus there may be complete fusion and mixing of the material 2 with the molten metal to form an alloy of the material 2 and metal of the part 1 or some of the material 2 may retain its composition and be bonded to metal of the part 1 by metal of the part 1 fused with the material 2.

Whether the material 2 is in particulate or in continuous, self-supporting form, metal of the part 1 underlying the material 2 is always heated to at least its melting point and is heated until such metal and the material 2 fuse with the result that when the heated area is cooled below the melting temperatures of the material 2 and the metal of the part 1, the area is structurally continuous.

As used herein, the term "structurally continuous" as applied to an area produced in accordance with the invention includes:

(1) A substantially homogeneous area or volume of metal which is the fusion product of the metal of the part and the added alloying material.
(2) An area or volume of metal which has added homogeneous metal therein, at least part of the latter metal being fused with the metal of the metal part.

In the event the added material is particulate, the term "structurally continuous" excludes an area or volume of metal which has a substantial number of discrete particles of added particulate material which have not merged with, and formed an alloy with, the metal of the part.

As used herein, the term "structurally continuous" as applied to a metal added to the molten metal means a metal which at room temperature is continuous, self-supporting, and homogeneous and which may, for example, be in strip, foil, wire or rod form.

The invention is particularly useful for use in connection with metals which are not heat hardenable by the methods set forth in said co-pending application Ser. No. 923,776, but it may also be used with heat hardenable metals which will harden because of the heating and cooling which occurs during the use of the present invention. For example, in the latter case, the metal of the part 1 in, or adjacent, the heated area will harden which may be desirable.

When the metal of the part 1 is not heat hardenable, e.g. low carbon steels, areas of improved properties may be provided thereon with the use of the invention. For example, with such low carbon steels, better wearing areas can be produced using high carbon steel wire or tungsten powder as the material 2 or by melting the steel of the desired area in an atmosphere of nitrogen to nitride the steel of the area which, when quenched, will produce hardness in the area.

With low or high carbon steels, the added material 2 may be higher carbon steels, stainless steels, alloy steels, hard facing alloys, high speed steels, nitrogen containing salts, carbon, or electrical contact material. Also, the melting of the steels may be performed in an atmosphere of an alloying material such as a carburizing atmosphere or an atmosphere of nitrogen.

Metal parts 1 of materials other than steel may also be provided with areas of different properties. For example, if the part 1 is made of copper, the added material 2 may be zinc to form a brass area, and if the part 1 is made of beryllium copper, the added material 2 may be silver to produce silver metal bonded to beryllium copper by a silver alloy, the silver metal being useful as an electrical contact. Broadly speaking, the invention may be used to produce a structurally continuous area or areas of metal on a metal part by melting the metal of the part and adding to the molten metal a material which will fuse and/or alloy with the metal of the part.

In some cases, the material 2 and/or the metal of the part 1 may rapidly oxidize at the temperature of the molten metal, and if this is undesirable, the melting of the metal may take place in an inert atmosphere, such as an atmosphere of argon or nitrogen, or in a reducing atmosphere, e.g. of hydrogen, the inert gas or the reducing gas surrounding the area being heated as the metal is melted. If desired, the added material 2 may include conventional flux materials.

An alternative form of the embodiment shown in FIGS. 1 and 2 is illustrated in FIG. 3. The embodiment illustrated in FIG. 3 operates in the same manner as the embodiment shown in FIGS. 1 and 2, but the functions of the portions 3a and 4a and the contacts 6 and 7, shown in FIG. 1, are performed by a pair of shaped metal blocks 8 and 9, e.g., made of copper, connected by suitable leads to the high frequency source and water cooled in any conventional way.

Thus, the blocks 8 and 9 have portions 10 and 11 which conductively contact the upper surface of the part 1 and have portions 12 and 13 which act as proximity conductor means, the current being concentrated at the adjacent faces of the blocks 8 and 9 due to the proximity effect. The portions 12 and 13, like the portions 3a and 4a, cause the current in the part 1 to be concentrated in a narrow path at the upper surface of the part 1 and underlying the alloying material 2.

To fuse the material 2 with the metal of the metal part 1, the desired width, depth, and length of the area where the fused metal is to be produced are determined and then, the frequency of the current is selected to provide a reference depth somewhat greater than the depth of the metal to be rendered molten. The contacts 6 and 7, or the contact portions 10 and 11 may be relatively small, e.g., ¼ to ½ inch in diameter or on a side, and the proximity conductors, 3a and 4a or 12 and 13, are made with a size, shape and length and a spacing with respect to the surface of the part 1 to provide the desired width and length of the metal under the material 2 to be melted, bearing in mind that the proximity conductors must carry hundreds of amperes. The spacing between the proximity conductors and the surface of the part 1 may be relatively small and preferably, the spacing is about two times the proximity conductor width, or less. After the material 2 has been deposited in said area, the high frequency current is then supplied to the contacts through the proximity conductors, and the magnitude and duration thereof required to provide the desired heating of the metal of the part 1 is determined by test. Generally speaking, the duration of the current flow will be relatively short, e.g., less than three seconds in order to avoid significant heating of the metal outside the desired area due to thermal conduction.

Due to the current distribution in the current path underlying the material 2, the current being the highest at the surface and decreasing rapidly as the depth increases, the surface temperature will rise faster than the temperature of the metal below the surface. In addition, when the current first flows in a magnetic material, such as steel, the reference depth is small, whereas when the temperature rises above the Curie point, such as at temperatures in excess of 1400° F., the reference depth may increase by about 100 times. Accordingly, the effective resistance, and the heating current depth, varies as heating ensues.

To vary the depth of heating and hence, melting, it may be desirable to vary the magnitude of the current in the current path during the heating cycle. For example, it may be desirable to have a large magnitude current at the beginning of the heating cycle and then, to reduce the current as the surface metal reaches its melting temperature thereby permitting the metal below the surface to melt by thermal conduction and current heating. Similarly, the depth of heating to melting temperature may be made greater, and may be greater than the reference depth, by increasing the length of the heating cycle and varying the current magnitude to produce the desired temperature distribution. Thus, the current magnitude may be largest at the beginning or the end of the heating cycle or be varied in other manners to produce the desired temperature distribution in the current path underlying the material 2 bearing in mind, however, that for self-quenching of the fused metal of the part 1, the heating must be very rapid in order that the quenching will be rapid and that to avoid melting of metal beyond the desired depth or metal which does not underlie the material 2, the heating must also be very rapid.

FIG. 4 illustrates the use of the invention to produce a line, or lines of alloy metal on the surface of a metal part 1. In FIG. 4, a proximity conductor 14 extends over the material 2 where the metal is to be melted and is connected at its end to a contact 15 which engages a side 16 of the part 1. Another contact 17 engages the opposite side 18 of the part 1 and is connected to the high frequency current source by a lead 19. The spacing between the conductor 14 and the upper surface of the part 1 may, for example, be from 1/16 to 3/16 inches. When current is supplied to the part 1 by way of the proximity conductor 14, the lead 19 and the contacts 15 and 17, metal along the path underlying the material 2 is heated to its melting temperature.

After each melted and cooled line of alloy metal is produced, the part 1 may be moved with respect to the contacts 15 and 17 in the direction of the arrow 20 to produce a series of spaced lines of alloy metal, shaded areas 21 and 22 in FIG. 4 representing lines of previously treated metal.

Because of the use of the proximity conductor, the line of melting and fusing need not be straight or continuous. For example, to produce a wavy line 23 the proximity conductor may be shaped in the form of the proximity conductor 14a shown in FIG. 5. Because of the proximity effect, the current will concentrate below the proximity conductor 14a, and its path will conform to the shape of the conductor 14a.

Figures 6, 7, 8:
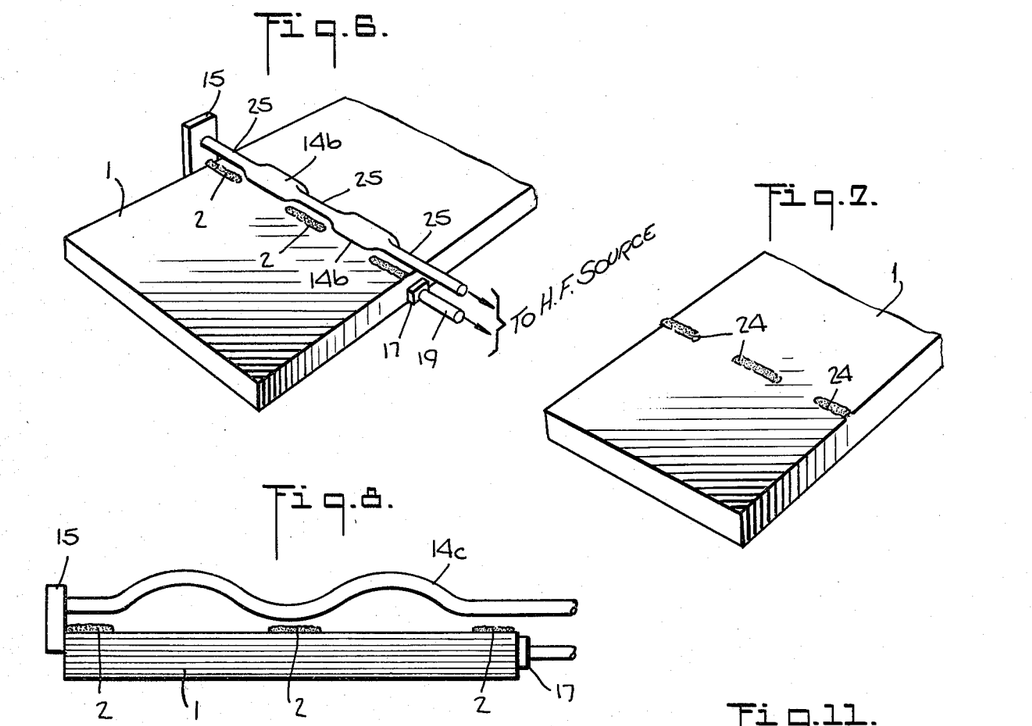
FIG. 6 is similar to FIG. 4, but illustrates a proximity conductor of varying cross-section for producing a series of aligned lines of molten metal on the surface of a metal part.
FIG. 7 illustrates the lines of alloy metal in a metal part obtained with the apparatus shown in FIG. 6.
FIG. 8 is a side elevation view of a proximity conductor which has a varying spacing with respect to a metal part for producing results similar to those shown in FIG. 7.

Similarly, by varying the width of the proximity conductor or its spacing with respect to the surface of the part 1, the current concentration, and the heating, below the proximity conductor may be varied to produce spaced, melted metal areas. FIG. 6 illustrates a proximity conductor 14b of varying width, and FIG. 7 shows the metal pattern segments 24 of fused metal, the melting occurring below the narrower width portions 25 of the conductor 14b because of the greater current concentration.

Segments of fused metal similar to the pattern segments 24 shown in FIG. 7 can also be obtained with the proximity conductor 14c shown in FIG. 8 which has a variable spacing with respect to the part 1, the current being more highly concentrated below the portions of the conductor 14c nearer the surface of the metal part 1.

An alternative method for producing the pattern illustrated in FIG. 7 is to use the apparatus illustrated in FIG. 4 but to provide areas of metal having an electrical conductivity significantly higher than the electrical conductivity of the metal of part 1 where melting is not desired. For example, if the metal of part 1 is steel, a line of copper plating may be provided where the current path is to be and portions thereof corresponding to the segments 24 are ground off prior to applying current to the part 1 along the path 2. In this way, because of the lower losses in the copper, the heating intermediate the segments 24 will be less. Of course, instead of applying a continuous line of copper and then grinding off the portions thereof corresponding to the segments 24, the copper may be applied to the part 1 by known techniques only where less heating is desired.

Figures 9, 10, 11:
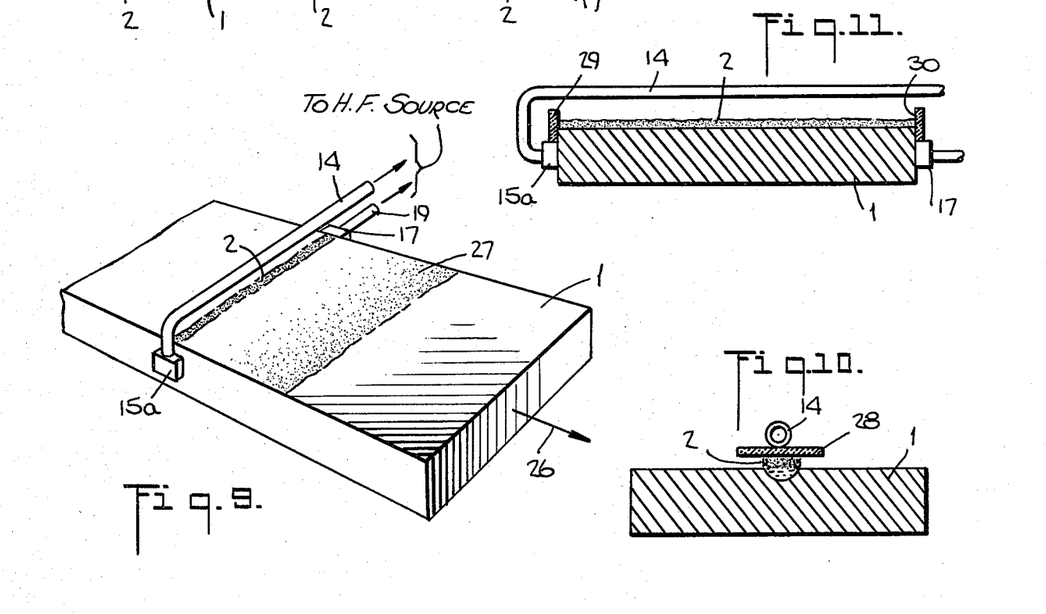
FIG. 9 is similar to FIG. 4, but illustrates the production of alloy metal over a wider area of the surface of a metal part.
FIG. 10 is a cross-sectional, end elevation view illustrating the use of a plate or bar to confine the metal being heated.
FIG. 11 is a cross-sectional, side elevation view illustrating the use of plates or bars at the ends of a line of metal being heated to prevent loss of metal.

If it is desired to produce a substantially continuous layer of alloy metal which is wider than the lines 21 and 22 (FIG. 4), the part 1 may be moved continuously or stepwise in small increments in a direction parallel to the surface of the part 1 being treated and perpendicular to the length of the current path as illustrated in FIG. 9. As illustrated in FIG. 9, the part 1 may be moved in the direction of the arrow 26 to produce a relatively large area 27 of melted and then cooled metal with the material 2 alloyed therewith at the upper surface of the part 1.

Because of the magnitude of the currents used in the method of the invention, the metal being treated is subjected to relatively large magnetic fields tending to displace the metal being melted, particularly with non-ferrous metals. The magnetic fields may be of sufficient magnitude to "blow" the molten metal away from its normal position. To avoid such removal of the molten metal and/or to hold the alloying material 2 in place while the metal therebelow is melted, the area being heated may be covered by a bar or slab 28 of high temperature resistant, insulating material, such as silicon nitride, as illustrated in FIG. 10. As the metal melts, or after it melts, the bar 28 may be pressed downwardly to force the alloying material into the molten metal. If the alloying material is particulate, the application of pressure to the particles will lower the electrical resistance thereof, and if pressure is applied during the time the current is flowing, more current will flow through the particles increasing the heating thereof.

Similarly, if the line or area of metal being melted extends from one side to the other side of the part 1 so that molten metal can drip or distort at the ends of the line, dams 29 and 30 of high temperature resistant, insulating material may be held against the sides of the part 1, as illustrated in FIG. 11, to hold the molten metal in place. Of course, such dams 29 and 30 may be used with a slab 28 or be extensions of the latter.

Although the molten metal may be merely permitted to cool after it has fused with the material 2, cooling may be assisted by directing a cooling gas or liquid on the heated metal or adjacent thereto. If desired, cooling may be hastened by chilling the metal part before applying the heating current.

Figures 12, 13, 14, 15:
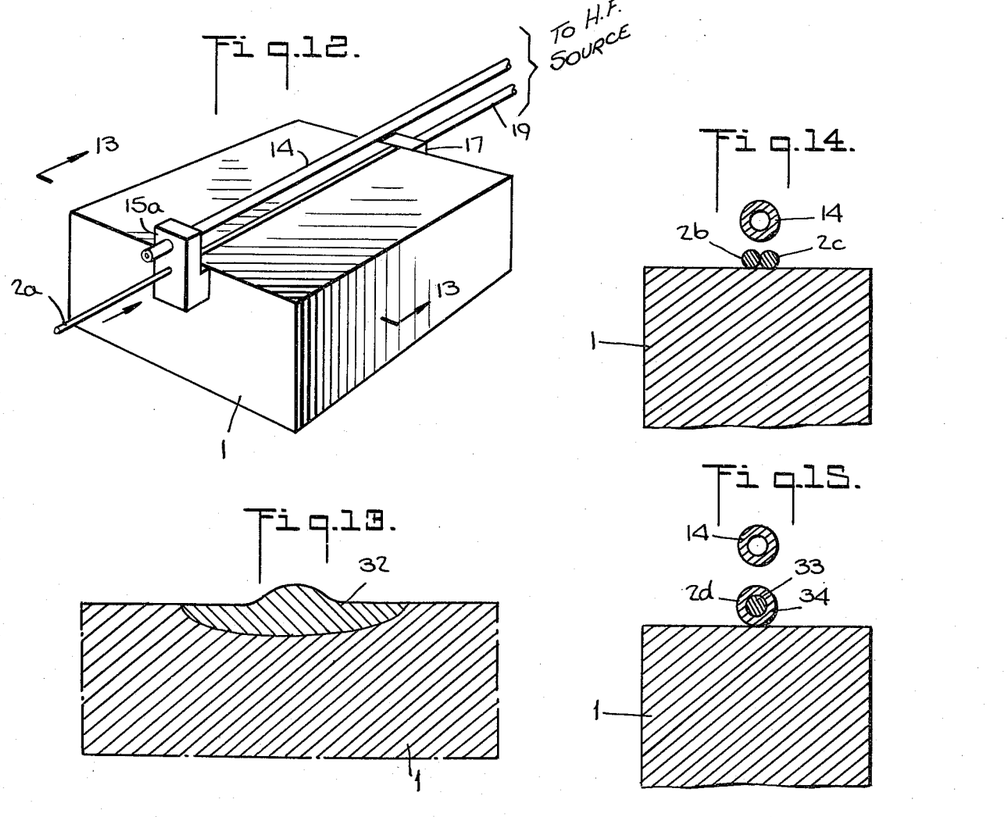
FIG. 12 is a schematic perspective view of a preferred embodiment of the invention for producing an area of alloy metal on the surface of a metal part using a wire or rod of the alloying metal.
FIG. 13 is an enlarged, fragmentary, cross-sectional view of a portion of the metal shown in FIG. 12 after the area of alloy metal is produced and is taken along the line 13—13 indicated in FIG. 12.
FIG. 14 is a fragmentary, cross-sectional view illustrating the use of the method of the invention for producing an area of alloy metal at the surface of a metal part using a pair of wires of alloying metal.
FIG. 15 is similar to FIG. 14 and illustrates the use of a wire of one metal having a layer of a different metal thereon.

A preferred embodiment of the apparatus for performing the methods of the invention is illustrated in FIG. 12, such apparatus being similar to the apparatus shown in FIGS. 4–11. A metal part 1, e.g., of low carbon steel, is contacted at its sides by contacts 15a and 17 to which the high frequency current is supplied by way of the proximity conductor 14 and the conductor 19. A structurally continuous wire 2a is fed through a hole in the contact 15a so that it rests on the top surface of the part 1 underneath the proximity conductor 1 and extends from the contact 15a to the edge of the part 1 adjacent the contact 17. The wire 2a may, for example, be a high carbon steel wire 0.020 inches in diameter. The current is supplied to the contacts 15a and 17 until the wire 2a and the underlying metal of the part 1 melt and fuse, the current being of the order of several hundred amperes and the duration thereof typically being from 0.1 to 1.0 second.

A test was conducted with essentially the apparatus and arrangement shown in FIG. 12 except that the wire 2a did not extend through a hole in the contact 15a and was held in place by insulating tape and a thin sheet of mica was placed on the tape between the tape and the proximity conductor 14. The test conditions were as follows:

Part 1—Bar of hot rolled steel 1½ inches square and several inches long; approximately 0.18% carbon and hardness of less than Rockwell C 20

Wire 2a—1½ inches long music wire (approximately 0.60% carbon) placed on end surface of bar approximately midway between a pair of bar side surfaces.

Conductor 14—⅜ inch copper bar overlying wire 2a and spaced from surface of part 1 by 0.08 inches.

Contacts 15a and 17—One engaging one side surface of the bar at one end of wire 2a and the other engaging the opposite side surface of the bar at the other end of wire 2a.

Current—Output of 160 kilowatt generator at 450 kHz.

Current duration—0.5 seconds.

The wire 2a and the surface of the part 1 under the wire 2a melted and the molten metal flowed together. After cooling, a slightly raised, uneven line of metal about 1/16 inch wide extended across the end surface of the bar. The line of metal was slightly ground to make it flat and Rockwell C measurements of the flat surface of the line of metal gave the following results:

Rockwell C hardness near one end—64.5
Rockwell C hardness near center—65
Rockwell C hardness near opposite end—61

An examination of a cross-section of the line of metal with a microscope showed that the metal was structurally continuous, FIG. 13 illustrating approximately an enlarged cross-section of the line of metal 32 before grinding.

A similar test without the wire 2a and the same part 1 gave Rockwell C hardness at respectively the same points of 28.5, 41.5 and 33.

If desired, the wire 2a may be replaced, in the method of the invention, by a pair of wires 2b and 2c of the same or different compositions as illustrated in FIG. 14. The wires 2b and 2c may be parallel to each other or twisted together. If, for example, the part 1 is made of an AISI C-1010 steel, the wire 2b is made of AISI C-1080 steel and the wire 2c is made of nickel, a line 32 of a nickel-steel alloy will be produced with the method of the invention.

Instead of a pair of wires 2b and 2c, a single wire 2d having a central core 33 and an outer layer 34 of a different metal, as shown in FIG. 15, may be used. The core 33 may, for example, be made of steel with a layer 34 of nickel plated thereon.

Figure 16:
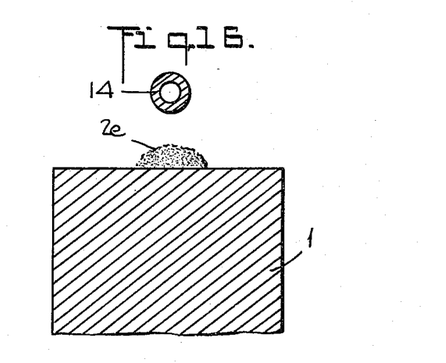
FIG. 16 is similar to FIG. 14 and illustrates the use of powdered alloying material.

Alternatively, a line of powdered material 2e may be placed on the surface of the part 1 as shown in FIG. 16, the material 2e being a substitute for the wires 2a-2d. The material 2e may, for example, by particles of a metal or metal alloy, powdered carbon or nitrogen containing salts, or a mixture of materials which, when added to molten metal of the part 1, will result in a line structurally continuous metal, after cooling, which has properties different from the metal of the part 1. If desired, or necessary, the powdered material 2e may be pressed into the molten metal by a bar, such as the bar 28 described in connection with FIG. 10.

In the embodiments previously described, the current is supplied to the metal of the part 1 to be heated and to the added material 2 by means of a pair of contacts and a proximity conductor. As mentioned hereinbefore, the heating current can be supplied to the metal part 1 and the added material 2 by means of an induction coil provided that the area in which the modified metal is to be produced is ring-shaped. In this connection, it should be borne in mind that the current induced in the part 1 must flow in a closed path which means that if the current is of sufficient magnitude and duration to cause melting of the metal, the metal along the entire path will be melted unless the coil is widened at points where no melting is desired or the distance between the coil and the adjacent part 1 is increased at these points.

Figure 17:
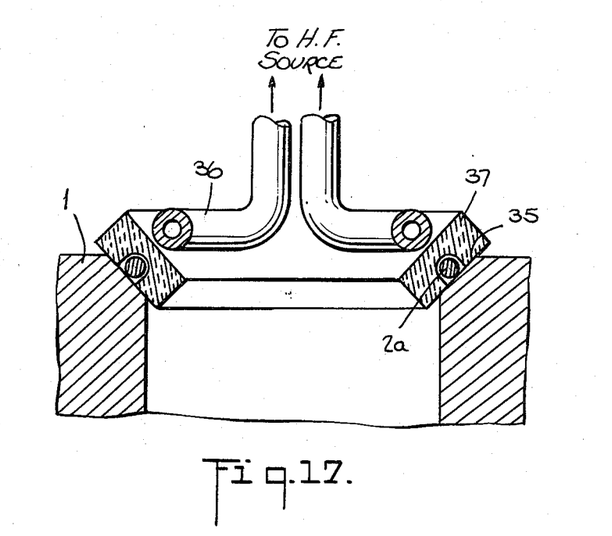
FIG. 17 is a fragmentary, cross-sectional view illustrating the use of the method of the invention to produce an area of alloy metal on the surface of a valve seat.

FIG. 17 illustrates the application of the method of the invention to the providing of a line of modified metal at the surface of a valve seat 35 using an induction coil 36. Thus, a wire 2a is held against the surface 35 of the valve seat by means of a ring-shaped retainer 37 of high temperature resistant, insulating material, such as silicon nitride. The heating current is induced in the surface 35 and in the wire 2a by means of the induction coil 36 which is connected to high frequency source. The current heats a restricted area of the surface 35 and the wire 2a to their melting temperatures causing the production of a line of modified metal at the surface 35 in the manner described hereinbefore in connection with the previous embodiments.

Figures 18, 19, 20, 21:
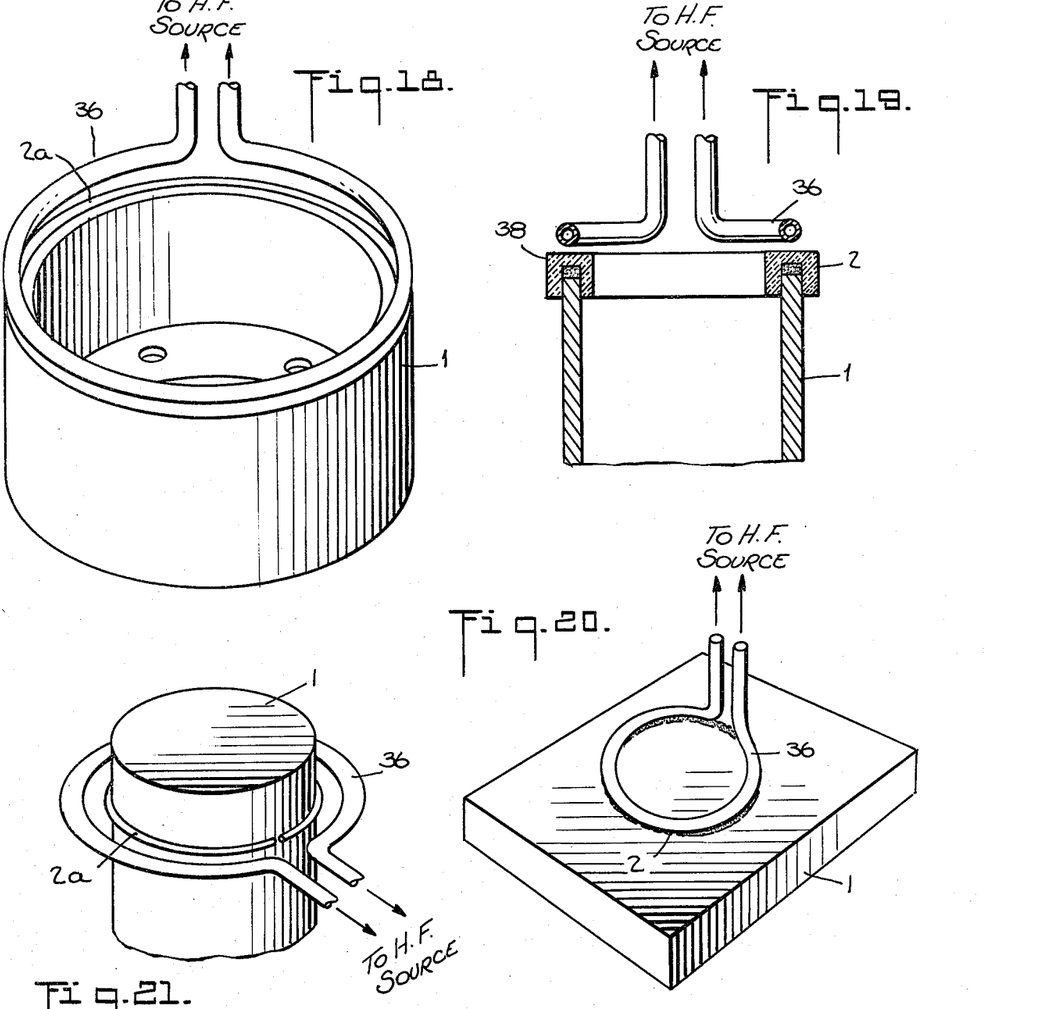
FIG. 18 is a perspective view illustrating the use of an induction coil to form an area of alloy metal at the end surface of a tube.
FIG. 19 is a cross-sectional, elevation view illustrating a modification of the apparatus shown in FIG. 18.
FIG. 20 is a perspective view illustrating the use of an induction coil to produce a ring-shaped area of alloy metal at the surface of a metal part.
FIG. 21 is a perspective view illustrating the use of an induction coil to produce a circumferential area of alloy metal on the surface of a metal cylinder.

As indicated in FIG. 18, an induction coil 36 may be used in accordance with the method of the invention to produce modified metal at the end surface of a tubular part 1. The part 1 may, for example, be a hole saw, and it is desired to provide a different metal at the end thereof where teeth are to be formed. A ring of wire 2a is placed on the end surface of the part 1, and a heating current is induced in the end surface of the part 1 and the wire 2a by means of the induction coil 36 connected to a high-frequency source. The end surface of the part 1 and the wire 2a become molten forming an alloy of the metal of the part 1 and the metal of the wire 2a at the end surface of the part 1.

If it is necessary to retain the wire 2a on the end surface of the part 1, or if the added material 2 is powdered material, the wire 2a or the powdered material 2 may be retained on the end surface by means of a ring-shaped retainer 38 made of a high temperature resistant insulating material, such as silicon nitride, as shown in FIG. 19.

FIG. 20 illustrates the use of an induction coil 36 to provide a ring-shaped line of modified metal at the surface of a metal part 1 intermediate its edges. The use of the apparatus shown in FIG. 20 is similar to the uses described hereinbefore in connection with FIGS. 17 and 18, the modified, ring-shaped line of metal being produced by heating the added material 2 and the metal at the surface of the part 1 to their melting temperatures to cause them to fuse and mix.

FIG. 21 illustrates a further use of an induction coil 36 to produce a circumferentially extending line of metal at the surface of a cylindrical metal part 1. Thus, in FIG. 21 a metal wire 2a is placed around the cylindrical part 1 so that it grips the surface of the part 1 and remains in place. The induction coil 36, connected to a high frequency source, is placed radially outwardly of the wire 2a, and current is supplied to the induction coil 36 until the metal at the surface of the part 1 and the wire 2a melt causing fusing and mixing of the molten metals. After cooling, the metal part 1 will have a circumferential line of modified metal where the melting and fusion have taken place. If necessary, the wire 2a and the molten metal may be held in place by a retainer of the type described hereinbefore.

In the embodiments illustrated in FIGS. 17–20, the ring-shaped area or line of modified metal is circular. It can, of course, have other shapes, e.g., oval, square, rectangular, sinuous, etc., and the portion of the induction coil 36 nearest the area will have a conforming shape. As used herein, "ring-shaped" is intended to include not only circular but also other closed shapes.

In the embodiments previously described, the length of the line of modified metal is limited essentially to the distance between the contacts or to the length of the induction coil conductor overlying the area to be treated. It is possible to use the method of the invention to provide a line of modified metal of indefinite length, that is, a length many times longer than the distance between the current supplying contacts by moving the metal part with respect to the contacts during the heating of the metal and the added material and supplying the added material to the area to be treated continuously.

Figure 22:
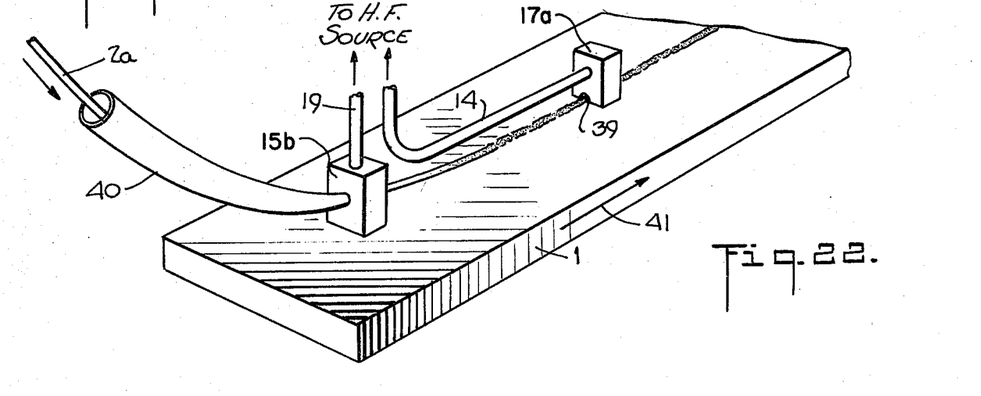
FIG. 22 is a schematic, perspective view illustrating the use of the method of the invention for producing a continuous length of alloy metal at the surface of a metal part.

FIG. 22 illustrates an embodiment of the invention in which the heating current and added material is supplied to the metal part while it is moved with respect to the contacts, thereby to produce a relatively long line of treated or modified metal at the surface of a metal part.

In the embodiment shown in FIG. 22, high frequency current is supplied to a contact 15b by way of the lead 19, and the contact 15b engages the upper surface of the metal part 1. High frequency current is also supplied to a contact 17a through the proximity conductor 14, the contact 17a engaging the upper surface of metal and the contact 17a having a groove 39 in the undersurface thereof for purposes hereinafter described.

A metal wire 2a is supplied through a guide tube 40 and a hole in the contact 15b to the upper surface of the part 1 beneath the proximity conductor 14. The guide tube 40 preferably is made of an insulating material.

The part 1 is moved continuously in the direction of the arrow 41 as heating current is supplied to the contacts 15b and 17a, and the wire 2a is supplied to the upper surface of the metal part 1 continuously and at approximately the same linear speed as the linear speed of the part 1. During the movement of the part 1 in the direction of the arrow 41, both the portion of the upper surface thereof below the proximity conductor 14 and the portion of the wire 2a beneath the proximity conductor 14 are heated by the heating current, and the rate of movement of the part 1 and the magnitude of the high frequency current are adjusted so that shortly in advance of the contact 17a, both the portion of the upper surface of the metal 1 and the wire 2a beneath the conductor 14 become molten, fuse and mix. The molten metal passes through the groove 39 at the underside of the contact 17a and cools as it leaves the downstream side of the contact 17a. Thus, as the part 1 moves in the direction of the arrow 41, a surface area of the part 1 is continuously melted and fused with molten metal of the wire 2a, and after the metal cools at or downstream of the contact 17a, there is provided a line of structurally continuous metal on the surface of the part 1 which is at least in part an alloy of the metal of the part 1 and of the metal of the wire 2a.

Figures 23, 24, 25, 26:
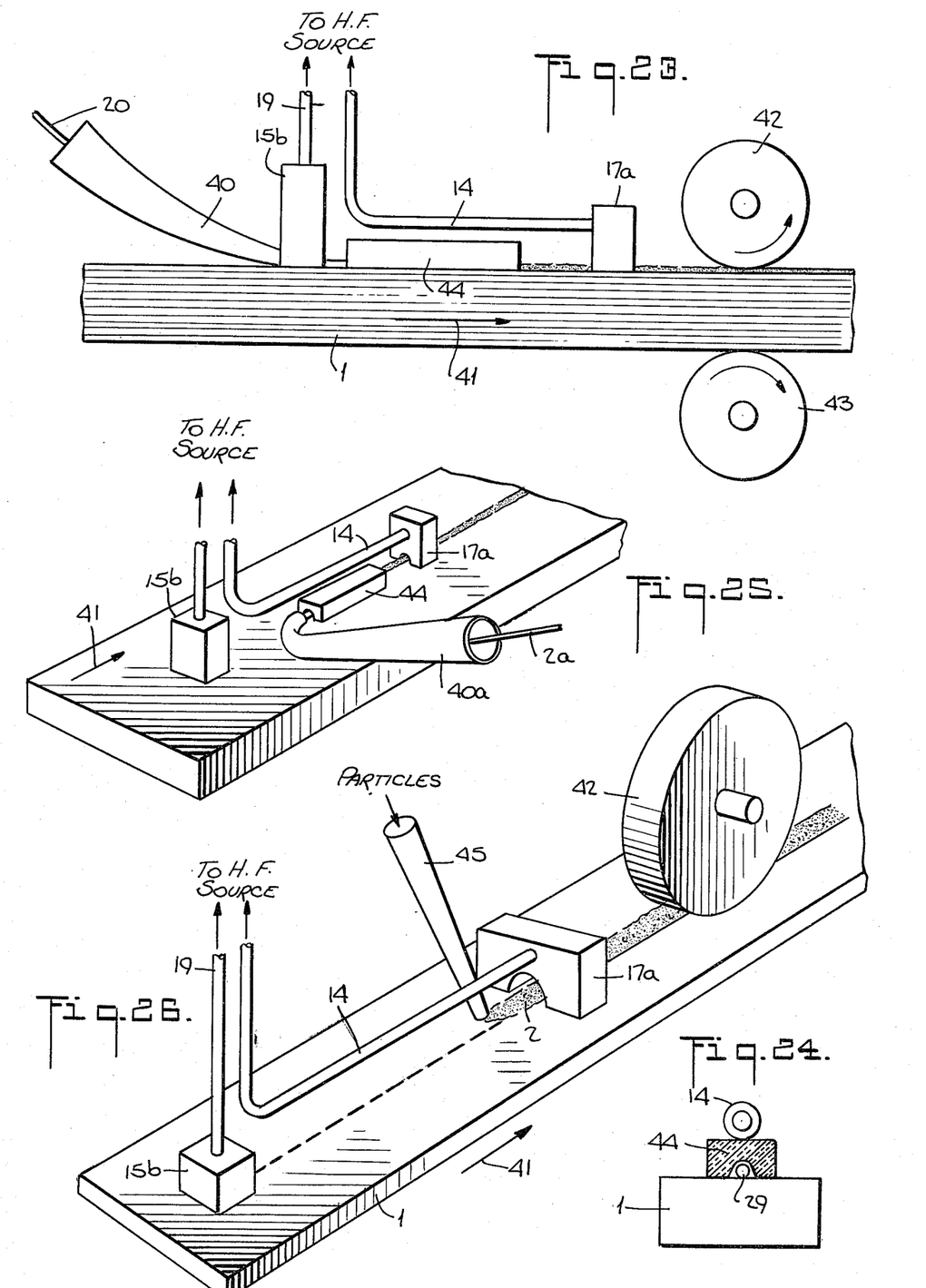
FIG. 23 is a side elevation view of the apparatus shown in FIG. 22 with the addition of a roll for working the alloy metal.
FIG. 24 is an end elevation, cross-sectional view of a modification of the apparatus shown in FIGS. 22 and 23.
FIG. 25 is a perspective view similar to FIG. 22 illustrating a different method of feeding the alloying metal to the surface of a metal part.
FIG. 26 is a perspective view similar to FIG. 22 illustrating an apparatus for supplying an alloying material to the surface of a metal part in powder form.

If the wire 2a and the adjacent surface of the metal part 1 are merely rendered molten and then permitted to cool, the line of modified metal will usually have a rather uneven upper surface. For the purpose of smoothing the line of metal, a roller 42 may be added to the embodiment shown in FIG. 22 as indicated in FIG. 23. Thus, the part 1 is supported by a lower roller 43, and the upper roller 42 engages and smooths the molten or hot metal as it moves downstream of the contact 17a.

Also, if desired, or if it is necessary to do so, the wire 2a may be confined by a retainer 44 shown in FIGS. 23 and 24, the retainer 44 being made of a high temperature resistant insulating material, such as silicon nitride.

It will be observed that the wire 2a has a relatively low thermal mass as compared to the thermal mass of part 1. Therefore, depending on the nature of the material of the wire 2a, the wire 2a may become molten before the portion of the upper surface of the part 1 with which it is to fuse, becomes molten. Accordingly, it may be desirable to feed the wire 2a to the surface of the part 1 as shown in FIG. 25. In FIG. 25, the wire 2a is fed through a guide tube 40a to the surface of the part 1 at a point about midway between the contacts 15b and 17a, so that the portion of the upper surface of the part 1 is preheated by the heating current prior to the time that the wire 2a contacts the part 1, the wire 2a not being heated prior to the time it contacts the surface of the part 1. Otherwise, the operation of the embodiment shown in FIG. 25 is the same as the operation of the embodiments in FIGS. 22–24.

In the embodiments shown in FIGS. 22–25 a wire 2a is fed to the surface of the metal part 1. If desired, the added material 2 in particulate form may be supplied to the surface of the metal part 1 using substantially the same apparatus as is shown in FIGS. 22–25. Thus, as shown in FIG. 26, particulate material 2 is fed through a guide tube 45 to the surface of the part 1 shortly in advance of the contact 17a. The distance between the lower end of the guide tube 45 and the contact 17a depends upon the nature of the particulate material 2 and the magnitude of the heating current. The conditions are selected so that both the particulate material 2 and the portion of the upper surface of the metal part 1 with which the particulate material 2 is to fuse are molten by the time that they pass underneath the contact 17a. After the fused metal passes downstream of the contact 17a, it may be smoothed and the metal of the material 2 and of the part 1 may be pressed together by a roller 42 and the part 1 may be supported by a roller 43 as described in connection with FIG. 23.

Figures 27, 28, 29, 35:
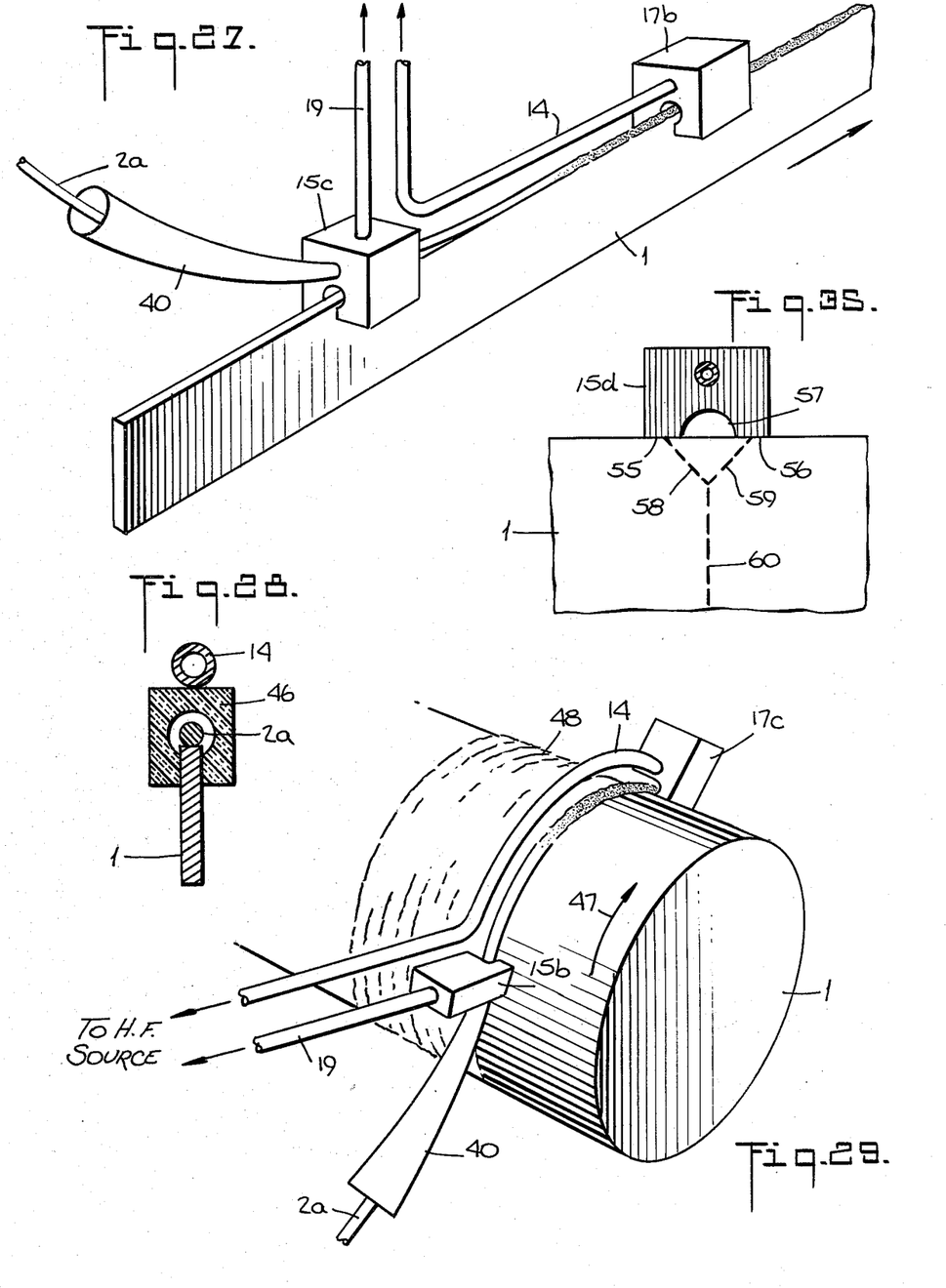
FIG. 27 is a perspective view of an apparatus similar to that shown in FIG. 22 for producing an area of alloyed metal at a side surface of a metal part.
FIG. 28 is a cross-sectional, elevation view illustrating a modification of the apparatus shown in FIG. 27.
FIG. 29 is a perspective view illustrating the use of the method of the invention to produce a layer of alloy metal at the surface of a metal cylinder.
FIG. 35 is a fragmentary, plan view illustrating a modification of contacts for supplying heating current to the metal part to be heated.

FIG. 27 illustrates the application of the principles described in connection with FIGS. 22–26 to the production of a layer of modified or alloyed metal at the edge of a metal part 1 in strip form. The metal part 1 may, for example, be a saw blade, and the layer of modified metal at the edge surface of the strip may be desirable for the formation of teeth. The operation of the embodiment illustrated in FIG. 27 is the same as the operation of the embodiment illustrated in FIG. 22. Also, if desired, or necessary, the wire 2a may be held in place by a guide 46 as illustrated in FIG. 28, the guide 46 being made of a high temperature resistant insulating material, such as silicon nitride.

If it is desired to provide a layer of modified metal on the surface of a cylindrical metal part, for example, if it is desired to provide a hard surface on a shaft or a roll, the arrangement illustrated in FIG. 29 may be employed. The arrangement illustrated in FIG. 29 is, in effect, a modified form of the apparatus shown in FIG. 22, and the wire 2a is fed through a guide tube 40 through a hole in the contact 15b and to the peripheral surface of the cylindrical metal part 1. As high frequency current is supplied to the contacts 15b and 17c, the metal part 1 is rotated about its axis in the direction of the arrow 47. The contact 17c is "L" shaped at its underside to permit the molten metal to pass thereunder. The metal part 1 and the wire 2a form a fused or molten mixture in advance of the contact 17a, and thereafter, the mixture cools to form a structurally continuous layer 48 of metal on the part 1, which layer 48 comprises metal of the wire 2a and metal of the part 1. The wire 2a may overlap, or contact at its side, previously modified metal as indicated in FIG. 29 or it may be spaced therefrom to provide a spiral line of modified metal at the surface of the metal part 1. The contact 15b may be shaped like contact 17c to permit the wire 2a to engage previously modified metal and yet permit the contact 15b to engage the cooler metal at the surface of the part 1. The wire 2a may be guided by a silicon nitride guide below the conductor 14.

Figures 30, 31, 33:
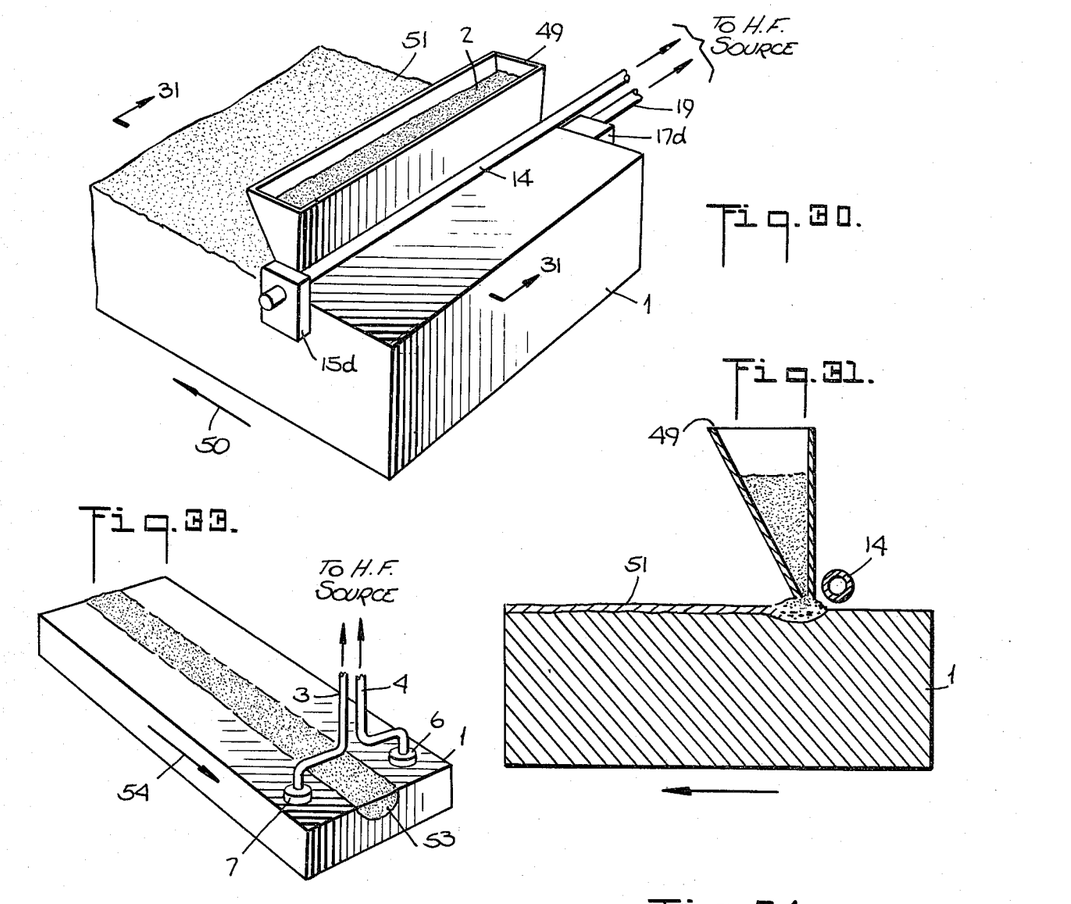
FIG. 30 is a perspective view illustrating the use of the method of the invention to produce a layer of alloy metal on the surface of a metal part.
FIG. 31 is a cross-sectional, side elevation view of the apparatus shown in FIG. 30.
FIG. 33 is a perspective view illustrating the use of the method of the invention to produce a continuous length of alloyed metal at the surface of a metal part.

A surface of a metal bar may silimarly be provided with a layer of modified metal with the arrangement illustrated in FIGS. 30 and 31. The side surfaces of a metal part 1 in the form of a bar are contacted by contacts 15d and 17d which preferably have the form described hereinafter in connection with FIG. 35, and heating current is supplied to the contact 15d through a proximity conductor 14. The contact 17d is connected to the high frequency source by the conductor 19.

A hopper 49 is positioned adjacent to the proximity conductor 14 and powdered added material 2 is supplied to the hopper 49. As the upper surface of the part 1 is heated to its melting point or higher by the high frequency current, the part 1 is moved in the direction of the arrow 50, and the powdered added material flows onto the molten metal of the part 1. The powdered added material 2 fuses with the molten metal and provides a layer 51 of structurally continuous, fused metal. The thickness of the layer 51 may be controlled by the height of the lower end of the hopper 49 above the upper surface of the part 1 and by the speed of movement of the part 1.

In the embodiments shown in FIGS. 30 and 31, the hopper 49 is downstream of the proximity conductor 14, but if desired, it may be positioned at the upstream side of the proximity conductor 14.

Figure 32:
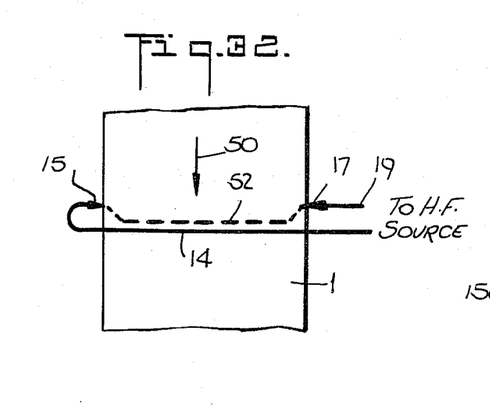
FIG. 32 is a fragmentary, plan view of a modification of a portion of the apparatus illustrated in FIG. 30.

It will be observed from an examination of FIGS. 30 and 31, that the contacts 15d and 17d are immediately adjacent very hot, molten metal, and it may be desirable to displace them slightly upstream of the proximity conductor 14 as shown in FIG. 32 so as to have the contacts 15d and 17 engage cooler metal. The principal current path which is indicated by the dotted line 52 in FIG. 32 will be slightly upstream of the proximity conductor 14 immediately adjacent the contacts 15d and 17d and will be substantially underneath the proximity conductor 14 inwardly of the side faces of the metal part 1. However, because the metal of the part 1 adjacent the side faces tends to heat more rapidly than the metal inwardly thereof, because such metal is adjacent to the side faces, the metal at the side faces will still reach melting temperature at substantially the same time as the metal inwardly thereof.

Although FIGS. 30 and 31 illustrate the production of a layer of modified metal on a flat surface, it will be apparent that the apparatus may also be used to apply a similar layer to the peripheral surface of a cylinder, rotation of the cylinder corresponding to movement of the bar, and the hopper 49 and the proximity conductor 14 extending axially of the cylinder.

A further embodiment of the invention for obtaining a relatively long line of modified metal is illustrated in FIG. 33. In this figure, a metal part 1 in the form of a bar having a groove 53 at its upper surface is filled with powdered added material 2, either before or during heating, and current is supplied to the contacts 6 and 7 through the conductors 3 and 4. As the metal at the surface of the groove 53 and the material 2 melt between the contacts 6 and 7, the part 1 is moved in the direction of the arrow 54 at a rate such that a structurally continuous surface area of fused metal of the part 1 and the added material 2 is produced in the groove 53. If desired, or if found to be necessary, the material 2 may be pressed into the moltel metal by a tapered paddle of silicon nitride which fits at least partly into the groove 53 and which is positioned adjacent and downstream of the contacts 6 and 7.

The principles of the invention may be employed for providing lines of modified metal either rectilinear, spiral or other shaped, on the interior surface of a hollow cylindrical part. For example, combustion engine blocks of aluminum are desirable for various reasons, but aluminum and aluminum alloys do not by themselves have the desired wear properties when such aluminum or aluminum alloys form the cylinder wall on which the pistons ride. Therefore, it is desirable to improve the wear properties of the cylinder walls, and an improvement may be obtained by providing lines of metal having better wearing properties on such cylinder walls.

Figure 34:
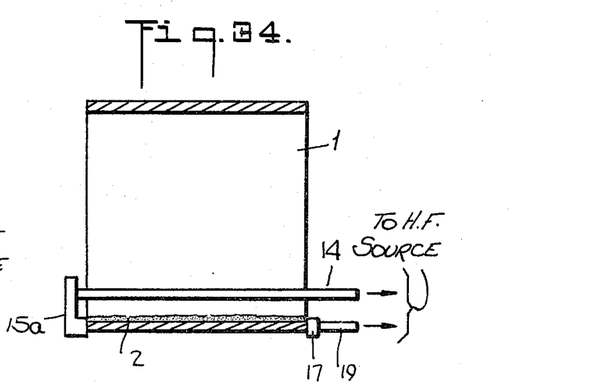
FIG. 34 is an axial section view illustrating the use of the method of the invention to produce axially extending lengths of alloyed metal on the inner surface of a hollow cylinder.

As illustrated in FIG. 34, a metal part 1 in the form of a tube or hollow cylinder, is contacted at its end surface with contacts 15a and 17. High frequency current is supplied to the contact 15a through the proximity conductor 14 and to the contact 17 through the conductor 19. A line of added material 2 which may, for example, be silicon in powdered or wire form, may be deposited on the inner surface of the part 1 beneath the proximity conductor 14. The inner surface of the part 1 beneath the proximity conductor 14 may be melted to a shallow depth and the added material 2 may also be melted in the manner previously described, to provide a line of structurally continuous, fused metal on the inner surface of the part 1. After the heating current is discontinued, the part 1 may be rotated around its axis by the desired amount, and the method may be repeated to provide a second line of modified, structurally continuous metal on the inner surface of part 1. The method may be repeated a number of times equal to the number of lines of modified metal desired on the inner surface of the part 1.

There are of course many materials which may be used for the material 2 to provide the lines of modified metal, and of course, the lines need not be rectilinear. Thus the shape of the proximity conductor 14 may be modified as described in our previously mentioned copending application entitled "SURFACE HARDENING OF METALS USING ELECTRIC CURRENTS", Ser. No. 923,776, and the line of modified metal may be sinuous, helical, etc.

It may be found that when the contacts are placed at the edges of a metal part, such as in the embodiments shown in FIGS. 4–12, 30, 32 and 34, the metal at the edges melts and falls or moves away from the edges or there is excess melting at the edges due to the position of the edges and the fact that the edge metal is not surrounded by cooler metal. The tendency to fall away may be offset by the use of the dams 29 and 30 described in connection with FIG. 11. However, the current will still be relatively concentrated at the edges and may melt metal below the dams 29 and 30, the metal at the edges may be heated to a temperature higher than the temperature of the remaining molten metal or there may still be excessive melting at the edges which may be undesirable.

To reduce the heating at the edges, the contacts, such as the contacts 15, 15a and 17, may be formed with two contacting surfaces as illustrated in FIG. 35. As shown therein, the contact 15d, or 17d, which may be connected to the conductor 14 or the conductor 19, and which may be used for both the contacts 15 or 15a and 17, has a pair of surfaces 55 and 56 which contact and supply current to the part 1. The surfaces are spaced by a groove 57, and current flows from the surfaces 55 and 56 along two paths 58 and 59 before joining in a single path 60. Thus, the current is not as concentrated at the edge of the part 1 as it is along the path 60. The spacing between the surfaces 55 and 56 depends upon the operating conditions and the results desired but may, for example, be of the order of one-sixteenth inch.

Although preferred embodiments of the present invention have been described and illustrated, it will be apparent to those skilled in the art that various modifications may be made without departing from the principles of the invention.

What is claimed is:

1. A method for producing in an area on the surface of a metal part, a volume of metal which is the fusion product of the metal of said part and an alloying material which forms an alloy with, and has a composition different from, the metal of said part, said fusion product having a composition different from that of the metal of said part and said volume of metal being structurally continuous, said method comprising:

heating the metal in said area of said surface to at least its melting temperature without heating adjacent metal to its melting temperature thereby to provide a pool of molten metal of said part extending inwardly from said surface and to be mixed with said alloying material, said heating being performed by causing an electric current having a frequency of at least 3000 Hz to flow in said area while causing a current of the same frequency to flow in a conductor overlying said area but which, at any instant, flows oppositely to the direction of the current flow in said area, said conductor being spaced from said area by a distance not greater than three times the width of said conductor, said current being caused to flow in said area by contacting said part with contacts respectively contacting the surface of the metal part at opposite ends of said area and connected to a source of said current, at least one of said contacts being connected to said source in series with said conductor;

depositing said alloying material on said area before, during or after heating of the metal of said area and heating said alloying material unit at least a portion thereof melts and the alloying material mixes with the molten metal of said part and the metal of said area is structurally continuous; and cooling the metal of said area to form a volume of metal in said area at the surface of said metal part which extends inwardly from said surface, which comprises an alloy of the metal of said part and of said alloying material formed in situ and which is structurally continuous.

2. A method for producing spaced lengths of metal at an area on the surface of a metal part said lengths of metal being the fusion product of the metal of said part and an alloying material which forms an alloy with, and has a composition different from, the metal of said part, said fusion product having a composition different from that of the metal of said part and said lengths of metal being structurally continuous, said method comprising:

contacting said metal part with a first contact means at one end of said area and with a second contact means at the opposite end of said area thereby to define the length of said area;

rapidly heating spaced lengths of the metal of said area at least to the melting temperature thereof without heating metal intermediate said lengths to said temperature by varying the heating along the length of said area, said heating being produced by supplying electric current having a frequency of at least 3000 Hz to said contact means, and hence, to said metal part, through proximity conductor means which overlies substantially the length of said area between said contacts, which is spaced from the surface of said area by not more than three times the width of said proximity conductor means in the direction substantially parallel to the surface of said area and perpendicular to said length of said area and which is connected to said contact means so that the current therein, at any instant, flows oppositely to the flow of current in said metal part and by varying the heating along the length of said area;

depositing said alloying material on the spaced lengths of metal of said area before, during or after the metal thereof is heated and heating the alloying material until at least a portion thereof melts and mixes with the molten metal of said part and the metal of said lengths of metal is structurally continuous; and cooling the lengths of metal to form a plurality of said spaced lengths of metal at the surface of said metal part each of which comprises an alloy of the metal of said part and of said alloying material and which is structurally continuous.

3. A method as set forth in claim 2 wherein said heating is varied by varying the shape of said proximity conductor means which overlies said area.

4. A method as set forth in claim 2 wherein said heating is varied by placing metal having an electrical conductivity higher than the electrical conductivity of the metal of said part on and in contact with said metal intermediate the places where said lengths of said fusion product are to be provided prior to supplying current to said area.

5. A method for producing in an area on the surface of a metal part a volume of metal which is the fusion product of the metal of said part and an alloying material which forms an alloy with, and has a composition different from, the metal of said part, said fusion product having a composition different from that of the metal of said part and said volume of metal being structurally continuous, said method comprising:

contacting said metal part with a first contact means at one end of said area and with a second contact means at the opposite end of said area thereby to define the length of said area;

rapidly heating the metal of said area at least to the melting temperature thereof thereby to provide a pool of molten metal of said part extending inwardly from said surface and to be mixed with said alloying material, said heating being performed by supplying electric current having a frequency of at least 3000 Hz to said contact means, and hence, to said metal part, through relatively long and narrow proximity conductor means which overlies substantially the length of said area between said contacts, which is spaced from the surface of said area by not more than three times the width of said proximity conductor means in the direction substantially parallel to the surface of said area and perpendicular to said length of said area and which is connected to said contact means so that the current therein, at any instant, flows oppositely to the flow of current in said metal part;

depositing said alloying material on said area before, during or after heating of the metal of said area and heating said alloying material until at least a portion thereof melts and the alloying material mixes with the molten metal of said part and the metal of said area is structurally continuous; and cooling the metal of said area to form a volume of metal in said area at the surface of said metal part which extends inwardly of said surface, which comprises an alloy of the metal of said part and of said alloying material formed in situ and which is structurally continuous.

6. A method as set forth in claim 5 wherein said material is a material which is a metal selected from the group consisting of carbon steel, tungsten, stainless steel, alloy steels, hard facing alloys, zinc and silver.

7. A method as set forth in claim 5 wherein said material is a gas selected from the group consisting of a carburizing gas and nitrogen.

8. A method as set forth in claim 5 wherein said material is in structurally continuous form.

9. A method as set forth in claim 5 wherein said material is in powder form.

10. A method as set forth in claim 5 wherein the metal of said part is a metal selected from the group consisting of steel, copper, aluminum and beryllium copper.

11. A method as set forth in claim 5 in which the metal of said area is heated in an atmosphere of an inert gas.

12. A method as set forth in claim 5 wherein said material is deposited on said area prior to the heating of the metal of said area.

13. A method as set forth in claim 5 wherein said alloying material is in the form of particles and further comprising confining said particles to said area with an insulating member extending between said proximity conductor means and said area during the heating of said area.

14. A method as set forth in claim 5 wherein said proximity conductor means comprises a pair of conductors and wherein said pair of conductors are positioned so that, together, they overlie substantially the full length of said area and one of said conductors is connected to said first contact means and the other of said conductors is connected to said second contact means.

15. A method as set forth in claim 5 wherein said proximity conductor means is a single conductor connected to said first contact and is positioned to overlie the full length of said area.

16. A method as set forth in claim 5 further comprising reducing the heating of the metal adjacent at least one of said contact means by supplying said current to said part through a pair of spaced surfaces on said one contact means engaging said part at one end of the length of said area so that the current follows a pair of paths adjacent said one contact means.

17. A method as set forth in claim 5 wherein said current has a frequency of at least 50 KHz, the duration of said current is less than one second, the magnitude of said current is such as to produce a power density of at least 20 kilowatts per square centimeter, the width of said proximity conductor is less than one-half inch and the spacing between said proximity conductor and said surface of said area is less than two times said width of said proximity conductor.

18. A method as set forth in claim 5 further comprising varying the magnitude of said current during the heating of said metal of said area to melt said metal.

19. A method as set forth in claim 5 further comprising producing relative movement between said part, on the one hand, and the contact means and said proximity conductor means, on the other hand, in a direction transverse to said length of said area, and when a first volume has been formed, similarly inserting said particles and successively similarly heating, and cooling at least one further volume of metal in a further area of said metal.

20. A method as set forth in claim 19 wherein said metal part is a tubular metal part, and said area is on the inner surface of said tubular metal part and extends axially thereof and wherein the width of the face of said proximity conductor nearest said area is small compared to the circumference of said inner surface.

21. A method as set forth in claim 19 wherein said part is moved step-wise and said current is discontinued before each step.

22. A method as set forth in claim 19 wherein said part is moved continuously and said current is interrupted as the metal of said area reaches said temperature to which it is to be heated.

23. A method as set forth in claim 19 wherein said current is supplied to said contact means continuously and said part is moved to interrupt the supply of current to said area as the metal of said area reaches said temperature to which it is to be heated.

24. A method as set forth in claim 5 further comprising producing relative movement between said part, on the one hand, and the contact means and said proximity conductor means, on the other hand, in the direction of said length of said area during the heating of said area.

25. A method as set forth in claim 24 wherein said part is continuously moved, said current is continuously supplied to said contact means and said material is continuously supplied to the surface of the molten metal.

26. A method as set forth in claim 24 wherein said metal part has a cylindrical surface and said area is on said surface and extends circumferentially thereof.

27. A method as set forth in claim 24 wherein said metal part has an edge surface and said area is on said surface.

* * * * *